United States Patent [19]

Aichele

[11] Patent Number: 5,800,035
[45] Date of Patent: Sep. 1, 1998

[54] WHEEL LIGHTING APPARATUS

[76] Inventor: William E. Aichele, 3311 Library Ave., Cleveland, Ohio 44109

[21] Appl. No.: 741,142

[22] Filed: Oct. 29, 1996

[51] Int. Cl.⁶ .................................................. F21V 7/04
[52] U.S. Cl. ...................................... 362/31; 362/78
[58] Field of Search ...................................... 362/78, 31

[56] References Cited

U.S. PATENT DOCUMENTS

| | | | |
|---|---|---|---|
| 2,083,514 | 6/1937 | Brown | 362/78 |
| 3,099,401 | 7/1963 | Bell | 362/78 |
| 4,088,882 | 5/1978 | Lewis . | |
| 4,371,916 | 2/1983 | De Martino | 362/31 |
| 4,787,014 | 11/1988 | Wodder et al. . | |
| 4,796,972 | 1/1989 | Thomas et al. . | |
| 4,800,469 | 1/1989 | Leon . | |
| 4,881,153 | 11/1989 | Scott | 362/78 |
| 5,276,593 | 1/1994 | Lighthill et al. . | |
| 5,278,732 | 1/1994 | Frankum . | |
| 5,455,485 | 10/1995 | Kutter . | |
| 5,530,630 | 6/1996 | Williams | 362/78 |

FOREIGN PATENT DOCUMENTS 880705  6/1953  Germany ........................ 362/78

*Primary Examiner*—Carroll B. Dority
*Attorney, Agent, or Firm*—Robert R. Hussey

[57] ABSTRACT

A wheel lighting apparatus is provided for use on a vehicle wheel rotatably mounted on a vehicle body. The wheel lighting apparatus includes a chamber mounted to the wheel with a portion of the chamber formed from material which contains the transmission of light therethrough. A light source is positioned in the chamber. A light transmitting member is provided for transmitting light from the light source to outside the chamber. The light transmitting member has a light receiving surface forming a portion of the chamber and is exposed to light from the light source. The light transmitting member also has a light conducting portion and a light emitting surface. The light received by the light receiving surface travels through the light conducting portion to the light emitting surface where the light is emitted in a predetermined pattern adjacent the wheel. An electrical connector device is provided to connect a power source mounted on the vehicle body to the light source. The electrical connector device includes a pair of circular rings of electrically conductive material mounted to the wheel and electrically insulated therefrom. The electrical connector device also includes a pair of contactors mounted to the body, each having an electrically conductive movable contact portion in electrical contact with their respective circular rings. A pair of electrical conductors are provided for electrically connecting the terminals of the power source to the light source through the flexible contact portion of flexible connectors and their respective rings.

15 Claims, 7 Drawing Sheets

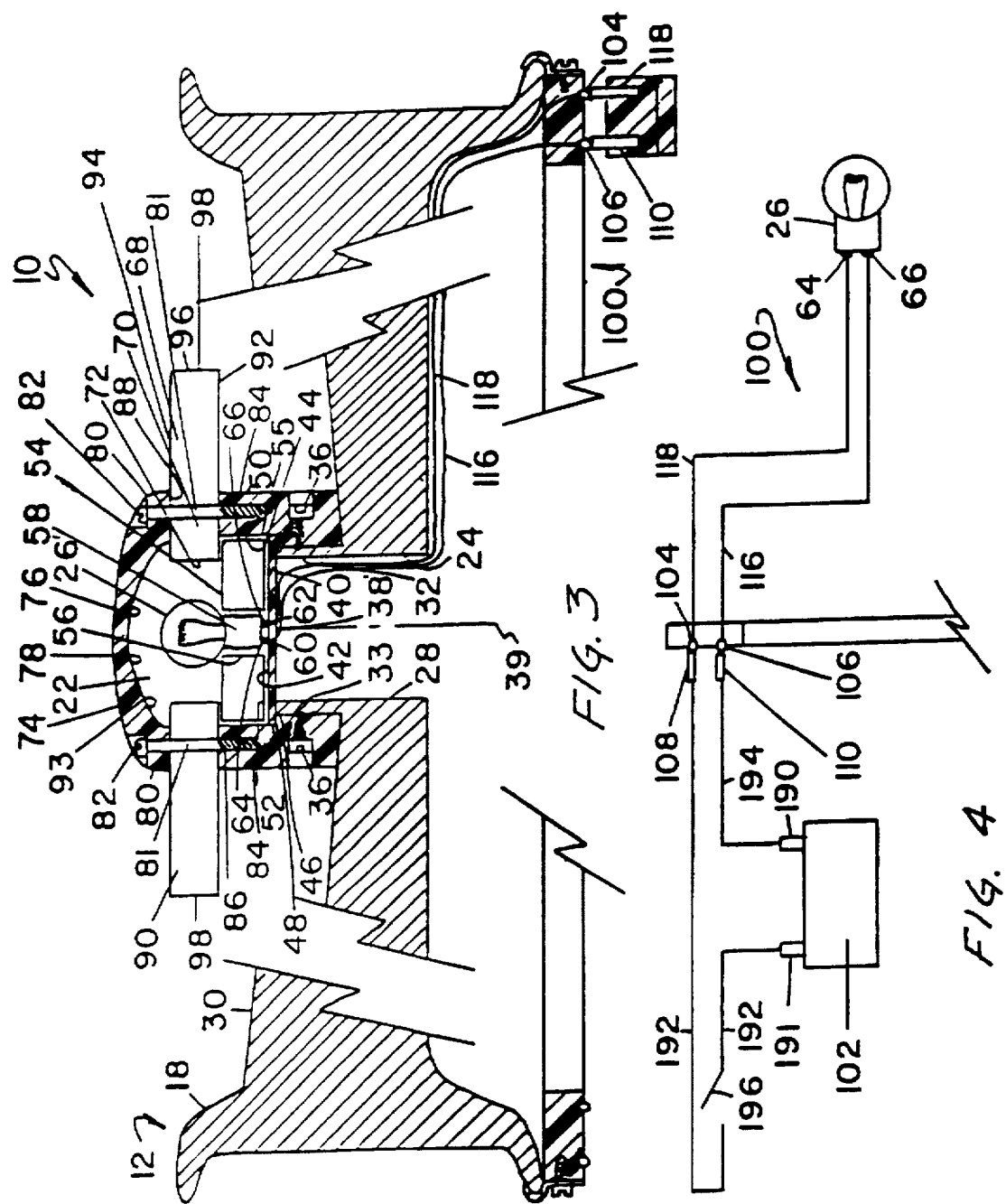

1

WHEEL LIGHTING APPARATUS

BACKGROUND OF THE INVENTION

The present invention relates to a wheel lighting apparatus or system and in particular to such apparatus and systems that provide illumination on the wheel of a vehicle.

The ascetic appearance of a vehicle is an important factor. The manufacturers of automobiles are constantly striving to improve the appearance of the automobiles they produce and have entire departments that constantly work on the ascetic appearance of their automobiles.

Improving the appearance of the wheels of the automobile from conventional stamped rims includes the use of wheel covers or hubcaps which have been provided in various designs and geometric configurations that are decorative and aesthetically appealing. In addition, the wheel rims themselves have been changed in design from the basic stamped rim to "mag" wheel rims of a number of different designs. These mag wheel rim and wheel cover designs have constantly attempted to provide a distinctive appearance on the vehicle which is ascetically pleasing.

Fiber optic technology recognizes that light may be conducted through a optically transmitting material such as plastic and glass. The light preferably enters the optically transmitting plastic through one end and is transmitted through the plastic away from that end. The sides of the plastic are polished so that as light travels through the plastic, the light reflects off of the sides as it moved down the plastic to the other end. It is desirable to contain the light in the plastic until it reaches a light emitting portion. The light emitting portion of the optically transmitting material is preferably not polished so that the light passes through it and is visible to the observer.

The safety of a vehicle is another important factor in the design of an automobile. It is recognized that the safety of a vehicle is improved when the vehicle is visible from the side, particularly in the dark or dimly lit conditions. To improve the visibility of a vehicle from the side, lights have been mounted on the sides of the vehicle body. Accordingly, a vehicle or pedestrian approaching the vehicle from its side can see the vehicle.

Various modifications have been made using reflectors, lighted reflectors, and lights. For example, U.S. Pat. No. 5,278,732 provides illuminated reflectors mounted on the spoked wheel of a bicycle. U.S. Pat. No. 4,800,469 discloses a self contained light with power source for mounting on the valve stem of a tire. U.S. Pat. No. 4,796,972 describes a rotary electrical contact assembly mounted on a bicycle wheel to power a lighted reflector mounted on a bicycle wheel. U.S. Pat. No. 4,787,014 discloses a self contained light source mounted on the spokes of a bicycle.

It is desirable to provide an automobile wheel which is unique. To achieve this objective, the design of the automobile wheel embodying unique features preferably allows for adaptation to a variety of designs and geometric configurations.

It is also desirable to provide an automotive wheel that has a distinctive appearance while being aesthetically pleasing. Since light attracts the attention of observers, it is desirable to utilize light to provide a unique and distinctive automobile wheel.

SUMMARY OF THE PRESENT INVENTION

The present invention provides a wheel lighting system with the above described desirable features that may be implemented in variety of wheel designs.

The wheel lighting system of the present invention utilizes fiber optics to illuminate a vehicle wheel in a unique design that may be adapted in a variety of geometric configurations and distinctive markings. By illuminating the wheel or an area adjacent the wheel, the safety of the vehicle on which the wheel is mounted is also enhanced.

The wheel lighting system of the present invention provides a chamber mounted on the hub of an automobile wheel with a light source, such as a light bulb, in the chamber. A portion of the chamber is formed from material which contains the light from the light bulb in the chamber.

The present invention provides a light transmitting member of fiber optic material for transmitting light from the light bulb to outside the chamber in a predetermined pattern. The light transmitting member has an interior portion or light receiving portion forming a part of the chamber and is exposed to the light from the light bulb.

The light enters the light transmitting member through its light receiving portion and travels outwardly and away from the chamber through a light conducting portion or exterior portion of the light transmitting member. The sides of the light conducting portion are smooth and preferably polished so as to operate as a fiber optic conductor.

The light conducting portion of the light transmitting member terminates in a light emitting portion for receiving light from the light conducting portion and emits that light in a predetermined pattern adjacent the wheel. Preferably the light emitting portion is not polished so as to allow the light to emit therefrom and not be reflected and contained in the light transmitting member. The light emitting portion is formed in a predetermined configuration to provide the desired aesthetic effect.

Another unique aspect of the lighting system of the present invention is that the light passing through the light conducting portion is not readily observable. The observer can "see through" the light conducting portion and it appears that the light emitting portion is the light source. This aspect of the present invention allows for a wide variety of designs and shapes of light.

The wheel lighting system of the present invention also provides an electrical connector device to connect a power source mounted on the vehicle body to the light source, such as a light bulb mounted on the vehicle wheel. The electrical connector device includes a pair of circular rings of electrically conductive material mounted to the wheel and electrically insulated therefrom. The electrical connector device also includes a pair of contactors mounted to the body. Each of the contactors has an electrically conductive movable contact portion in electrical contact with their respective circular rings.

The power source has a pair of terminals which are connected to the light source through the electrical connector device. A pair of conductors, such as wires, connect the terminals of the power source to the pair of contactors through to their respective circular conductive rings. Another pair of conductors such as wires on the wheel connect the power transmitted through the rings to the light bulb which provides light in the chamber on the wheel. A switch is also provided to turn the light source on or off, as the case may be.

The present invention provides a wheel lighting system that renders an automobile wheel unique and allows for adaptation to a variety of designs and geometric configurations. The wheel lighting system of the present invention provides an automobile wheel that has a distinctive appearance while being aesthetically pleasing. Since light attracts the attention of observers, the present invention utilizes light to provide such a unique and distinctive automobile wheel.

The designs and geometric configurations that the wheel lighting system of the present invention provides is limited only by the imagination of the designer. For example, if the light conducting portion is etched, the light will emit from the etched portion in the configuration of the etching. If the light emitting portion is the outer edge of the light transmitting member, the outer edge may be configured in a variety of shapes and designs which may also vary in appearance as the wheel rotates dependant on the speed of rotation.

The wheel lighting system of the present invention also improves the safety of the vehicle on which it is used. The lighting system provides light which is visible from the side and consequently a vehicle or pedestrian approaching the vehicle from its side can see the vehicle. In addition, when the lighting system of the present invention is on a moving vehicle, the motion of the light further attracts attention to further enhance the safety features provided by the present invention.

Other desirable features and advantages of the present invention will become apparent from a study of the following description and the accompanying drawings which are illustrative of the invention.

BRIEF DESCRIPTION OF THE DRAWINGS

FIG. 3 is a sectional view of the wheel illumination system of the present invention taken along line 3—3 of FIG. 2

FIG. 4 is an electrical schematic diagram of the electrical circuit of the wheel illumination system of the present invention.

DETAILED DESCRIPTION OF THE INVENTION

Figure 1:
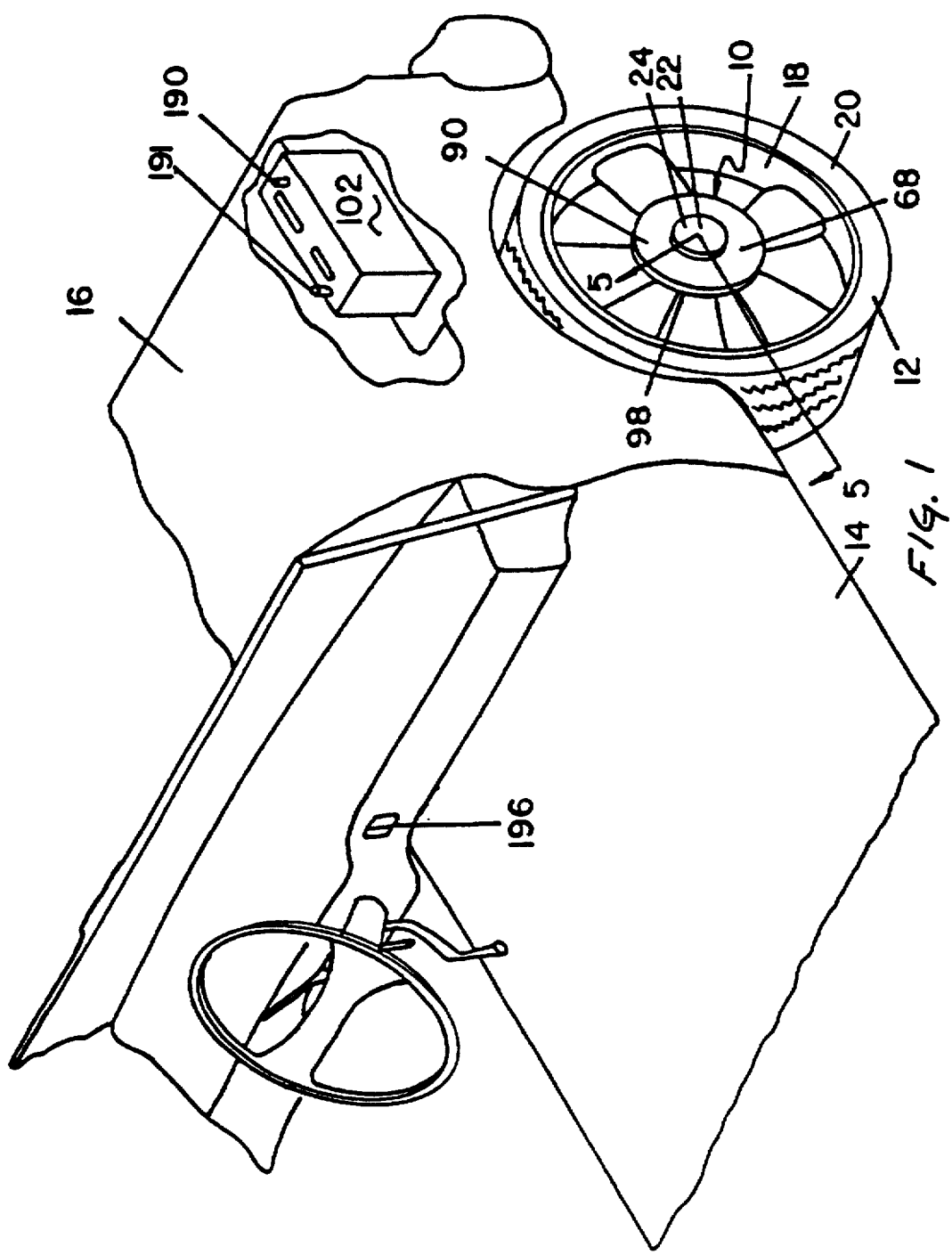
FIG. 1 is a perspective view of a vehicle provided with the wheel lighting system of the present invention.

A wheel lighting apparatus or system 10 is provided for use on a vehicle wheel 12 rotatably mounted on a vehicle body 14 of the vehicle 16, schematically shown in FIG. 1. It should be understood that the wheel lighting apparatus 10 may be used with a wide variety of vehicles, such as automobiles and trucks, and the vehicle 16 is illustrative of such vehicles. The wheel 12 has a rim 18 and a tire 20 mounted on the rim 18 to support the vehicle 16 as it moves. The wheel 12 is rotatably mounted on the vehicle body 14 in any conventional manner known to those skilled in the art. For ease of description, the wheel lighting system 10 is shown mounted on the front wheel 12 of the vehicle 16 and it should be understood that it may also be used on the rear wheel of a vehicle.

Figure 2:
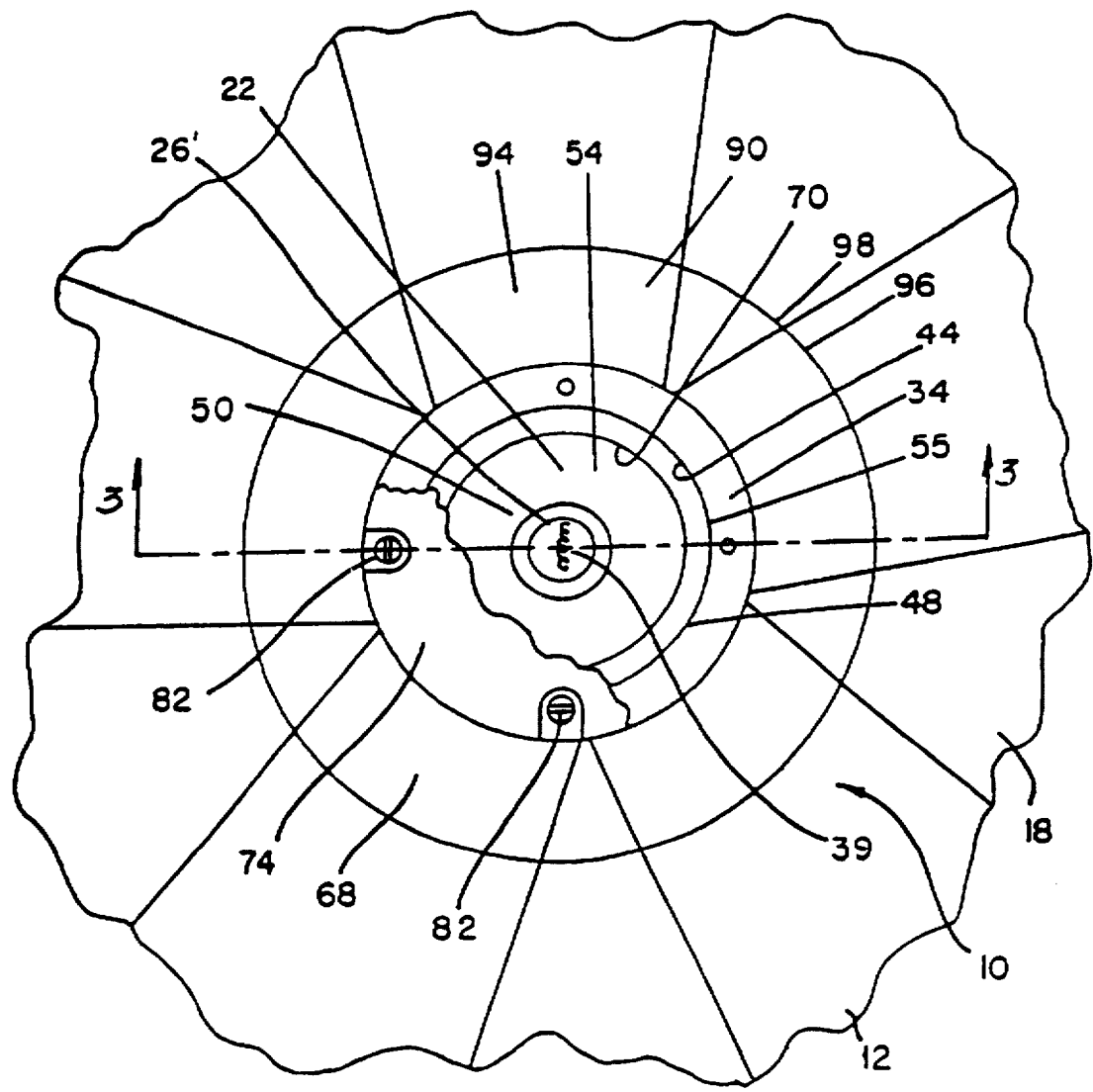
FIG. 2 is an enlarged view of the wheel illumination system shown in FIG. 1 and mounted on a wheel.

The wheel lighting system 10 of the present invention provides a chamber 22 mounted on the hub 24 of the wheel 12 with a light source 26, such as a light bulb 26, mounted in the chamber, as seen in FIGS. 1, 2, and 3. The hub 24 has an outwardly protruding flange 28 extending towards the outside 30 of the wheel 12 and terminating in an end 32. The chamber base 34 has an opening 33 therein for receiving the flange 28. Threaded fasteners 36 are provided for threadedly engaging the chamber base 34 and mounting the base 34 to the wheel 12 as will be more fully described.

To mount the light bulb 26 in the chamber, a bottom member 38 is provided. The bottom member 38 has a bottom surface 40 which engages the end 32 of the flange 28, and a top surface 42. The base 34 has an opening 44 adjacent to and larger than the opening 33 and receives the bottom member 38 therein. The support shoulder 46 extends between the openings 44 and 33 of the base 34 and supports the bottom member 38. The outer periphery 48 of the bottom member 38 fits inside the opening 44 in the chamber base 34 and when assembled, the bottom surface 40 of the bottom member 38 is in contact with the shoulder 46 and the end 32 of the flange 28.

To secure the base 34 and bottom member 38 in an assembled position on the flange 28, the threaded fasteners 36 are threaded into the base 34 towards the flange 28 until they securely engage the flange and consequently secure the base 34 and bottom member 38 to the wheel 12. The base 34 and consequently the chamber 22 is centered around the rotational axis 39 of the wheel 12. It should be understood that other devices and designs may be provide to secure the chamber 22 to the wheel 12.

A bulb mounting disc 50 is provided for mounting and securing the light bulb 26 in position in the chamber 22. The bulb mounting member or disc 50 has a bottom surface 52 adjacent the top 42 of the bottom member 38 and extends upwardly of the bottom surface 52 to its top surface 54 which defines a portion of the chamber 22. The bulb mounting disc 50 has an outer peripheral surface 55 which frictionally engages the surface of the opening 44 of the base 34. The bulb mounting disc 50 also has a threaded opening 56 centrally located in the chamber 22 for threadedly engaging the base 58 of the bulb 26. It should be understood that light bulbs have a variety of base designs, such as protruding pins, and it is within the contemplation of this invention to modify the bulb mounting portion accordingly to secure bulbs of various designs in the chamber 22.

To provide power to the light bulb, the contacts 60, 62 are provided and attached to the top 42 of the bottom member 38. The contacts 60, 62 are positioned so that when the bulb 26 is mounted in the bulb mounting disc, the contacts 64, 66 of the bulb 26 are in electrical contact with their respective contacts 60, 62 on the bottom member 38.

The bulb mounting disc 50 allows for simplified bulb replacement and protects the bulb from shock. Preferably the bulb mounting disc 50 is made from expanded heat resistant plastic material and when it is necessary to replace the bulb, the disc 50 is pulled out of the opening 44 of the base 38 with its surface 55 sliding along the surface 44 until the disc is removed. The bulb 26 may then be replaced and then the disc 50 with a new bulb 26 may be inserted in the opening 44 until the contacts 60, 62 of the bulb 26 contact their respective contacts 64, 66.

It should be understood that the frictional contact between the bulb mounting disc 50 and the base 38 is sufficient to retain the bulb 26 in position so that its contacts 60, 62 stay in contact with their respective contactors 64, 66 during operation of the vehicle. It should also be understood that it is within the contemplation of this invention to mount the contacts 64, 66 in any position on the bottom member 38 or bulb mounting disc 50 to contact their complementary contacts on the bulb regardless of their position.

The wheel lighting system 10 also provides a light transmitting member 68 of fiber optic material for transmitting light from the light bulb 26 to outside the chamber 22 in a predetermined pattern. Any known fiber optic material, such as glass or plastic, may be used to form the light transmitting member 68.

The light transmitting member 68 has an interior or light receiving portion 70 forming a part of the chamber 22 and its interior or light receiving surface 72 is exposed to the light from the light bulb 26. Preferably, the light receiving surface 72 of the light receiving portion 70 is roughened and not polished so as to allow the light to be received therein and not reflected. The surface 72 of the light receiving portion 70 is positioned adjacent and in close proximity to the light bulb 26 so as to receive the maximum amount of light. In addition, the balance of the chamber 22 or chamber portion 93 is formed from material which prevents the transmission of light therethrough and contains the light in the chamber. Preferably, the chamber portion 93 has a reflective surface as will be further described so as to reflect the light in the chamber to further increase the amount of light received by the light receiving portion 70 of the light transmitting member 68.

A cap 74 is provided to enclose the chamber 22. The cap 74, as seen in FIGS. 2 and 3, has a dome shaped inner surface 76 which preferably has a reflective coating 78 to reflect light and increase the amount of light available to be received by the light receiving surface 72. The light receiving surface 72 forms the light receiving portion 72 of the chamber 22.

To secure the cap 74 to the base 34, the cap has openings 80 about its periphery for receiving the threaded fasteners 82 therein. The light transmitting member 68 has openings 81 therethrough for receiving the threaded fasteners therein. The base member 34 has threaded apertures 84 about its outer surface 86 which are positioned to threadedly engage the threaded fasteners 82 positioned in the openings 80, 81 through the cap 74 and light transmitting member 68 respectively. The cap 74 has an inner surface 88 which is in contact with the outer surface 94 of the light transmitting member 68 and the inner surface 92 of the light transmitting member is in contact with the outer surface 86 of the base member 34.

When the threaded fasteners 82 are tightened, the surfaces 86, 92 of the base 34 and light transmitting member 68 respectively, and the surfaces 94, 88 of the light transmitting member and cap 74 respectively, create a seal therebetween to seal out contaminants from entering the chamber 22. By sealing contaminants out of the chamber, light is more effectively transmitted to the light transmitting member 68.

If contaminants were on the light receiving surface 72, the contaminants would block the light from being received thereby.

With the exception of the light receiving surface 72, the balance of the inner surface or chamber portion 93 of the chamber 22 blocks light passing therethrough and preferably has a reflective surface as described herein. The balance of the inner surface 93 includes the inner surface 76 of the cap 74 and the top surface 54 of the disc 50. It should be understood that for freedom of design it is within the contemplation to conduct light from the chamber 22 in other designs, such as logos or designs visible through the cap 74.

The light enters the light transmitting member 68 through its light receiving portion 70 and travels outwardly and away from the chamber 22 through a light conducting portion or exterior portion 90 of the light transmitting member. The inner and outer sides 92, 94 respectively of the light conducting portion 90 are smooth and preferably polished so as to operate as a fiber optic conductor. Preferably the sides 92, 94 are equidistant from each other to efficiently conduct the light therealong. The light conducting portion 90 extends radially outwardly of the chamber 22, but it should be understood that it is within the contemplation of this invention that the light conducting portion may extend in any direction desired by the designer.

The light conducting portion 90 of the light transmitting member 68 terminates in a light emitting portion 96 having an outer or light emitting surface 98 for receiving light from the light conducting portion and emits that light in a predetermined pattern adjacent the wheel 12. Preferably, the light emitting surface 98 is not polished so as to allow the light to emit therefrom and not be reflected and contained in the light transmitting member 68.

The light emitting portion 96 and its light emitting surface 98 is formed in a predetermined configuration to provide the desired aesthetic effect. For example, the drawings show the light emitting surface 98 in a circular configuration adjacent and substantially perpendicular to the rim 18. In this configuration, the light emits from the surface 98 radially outwardly and a portion of the light emits axially. The radial component of light creates a circle of light around the surface 98, the axial component of light towards the rim illuminates the rim and the axial component of light away from the rim appears to the observer at the side of the vehicle as a circle of light. By changing the shape of the light emitting surface 98 a variety of lighting effects may be achieved. In addition, the light emitting surface may be beveled or in a variety of different shapes to produce different lighting effects.

Another variation of the position of the light emitting surface 98 contemplated by the present invention would be to etch a shape in the outer surface 94 to create a light emitting surface in the shape desired. In this variation of the present invention, the outer surface 98 may be polished to reflect additional light to the etched shape or alternatively the outer surface 98 may be roughened to increase the amount of light emitted therefrom.

Another unique aspect of the lighting system 10 of the present invention is that the light passing through the light conducting portion 90 is not readily observable if it is polished. The observer can "see through" the light conducting portion 90 and it appears that the light emitting portion is the light source. The above aspects of the present invention allow for a wide variety of unique designs and shapes of light.

Figure 5:
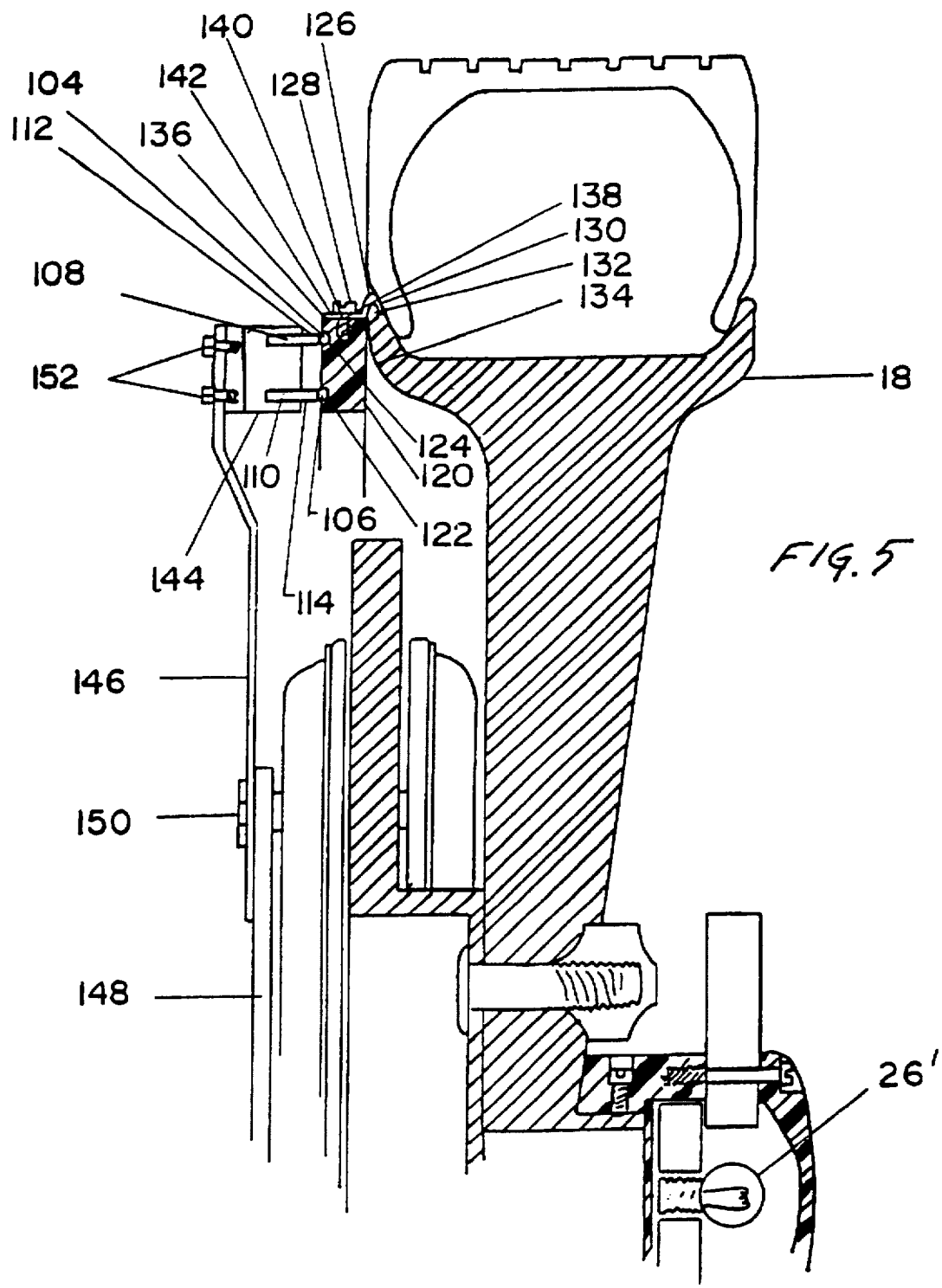
FIG. 5 is a cross sectional view of the wheel and wheel illumination system shown in FIG. 1 and taken along line 5—5 thereof illustrating the rotary connector device of the present invention.

The wheel lighting system 10 of the present invention includes an electrical connector device 100 to connect a power source such as the battery 102 mounted on the vehicle body 14, shown in FIGS. 1 and 4 to the light source, such as the light bulb 26 as seen in FIGS. 3–5. The electrical connector device 100 includes a pair of circular rings 104, 106 of electrically conductive material mounted to the wheel 12 and electrically insulated therefrom. The electrical connector device 100 also includes a pair of contactors 108, 110 mounted to the body 14. Each of the contactors 108, 110 has an electrically conductive movable contact portion 112, 114 in electrical contact with their respective circular rings 104, 106.

As seen in FIG. 3, the contacts 64, 66 on the bottom member 38 are in contact with the contacts 60, 62 on the bulb 26, the electrical connector device 100 includes a pair of wires 116, 118 having one end connected to their respective contacts 64, 66 and their other ends connected to their respective circular rings 104, 106 as seen in FIGS. 3 and 4. Accordingly, electrical power supplied to the rings, 104, 106 is transmitted to the light bulb 26 to generate light.

Figure 6:
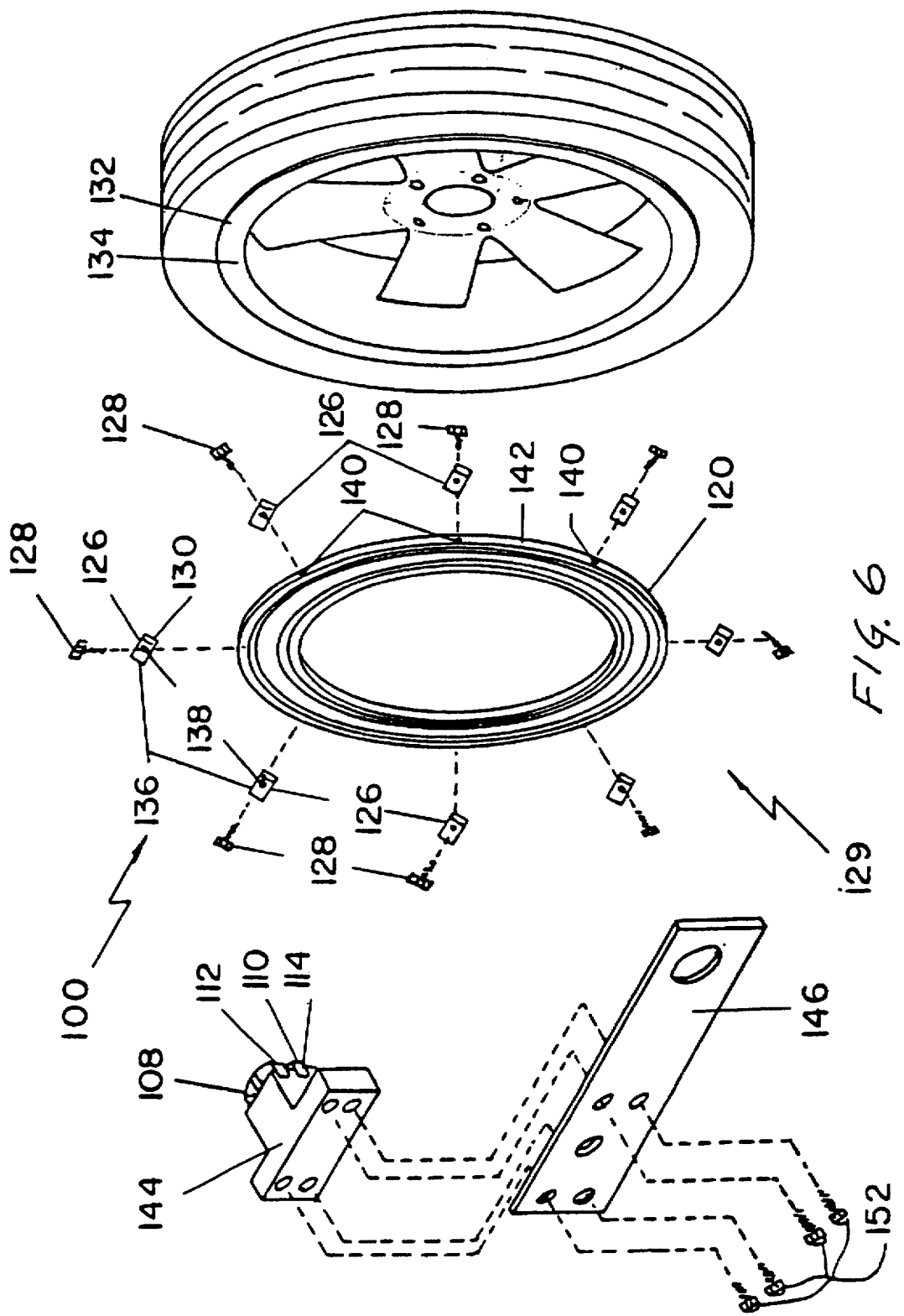
FIG. 6 is an exploded assembly view of the rotary connector device of the present invention.

The electrical connection between the pair of circular rings 104, 106 mounted to the wheel 12 and the pair of contactors 108, 110 mounted to the body 14 provide a reliable electrical connection therebetween with the body being rotationally fixed and the wheel being rotatable with respect thereto. As seen in FIGS. 5 and 6, the circular rings 104, 106 are mounted in a mounting ring 120. The mounting ring has an inner and outer groove 122, 124 for receiving a portion of the rings 104, 106 respectively therein. The rings 104, 106 are secured in the grooves 124, 122 by any conventional means, such as by friction or an adhesive. The rings 104, 106 extend out of their respective grooves 122, 124 so that the contactors 108, 110 respectively are in electrical contact therewith to facilitate an electrical connection therebetween as described herein. The mounting ring 120 is made from electrically nonconductive material so that the electrical circuit is maintained.

The mounting ring 102 is mounted on the rim 18 of the wheel 12 with a mounting apparatus 129 having clips 126 and fasteners 128. Such mounting apparatus 129 may be implemented by removing the wheel 12 from the vehicle body 14 and does not require any disassembly of the wheel. As seen in FIGS. 5 and 6, the clips 126 are positioned around the circumference of the mounting ring 102. The clips 126 have a hook portion 130 on one end formed to be received over the outer edge 132 of the inside 134 of the rim 18. The other end 136 of the clips 132 have an opening 138 therein for receiving the threaded fasteners 128 therein. The mounting ring 102 has threaded openings 140 about its peripheral edge 142 for threadedly engaging the threaded fasteners 128 therein.

Accordingly, the mounting ring 102 may be readily mounted or dismounted from the rim 18. To mount the mounting ring 102 on the rim 18, the hooks 130 of the clips 132 are hooked over the outer edge 132 of the inside 134 of the rim 18. The threaded fasteners 128 are positioned in the openings 138 on the other end 136 of the clips 132 and threadedly engage the threaded openings 140 in the outer peripheral edge 142 of the mounting ring 102. The fasteners 128 are then tightened and the mounting ring 102 is secured to the rim 18.

The electrical connector device 100 also includes a pair of contactors 108, 110 mounted to the body 14. Each of the contactors 108, 110 has an electrically conductive movable contact portion 112, 114 respectively in electrical contact with their respective circular rings 104, 106.

Figure 7:
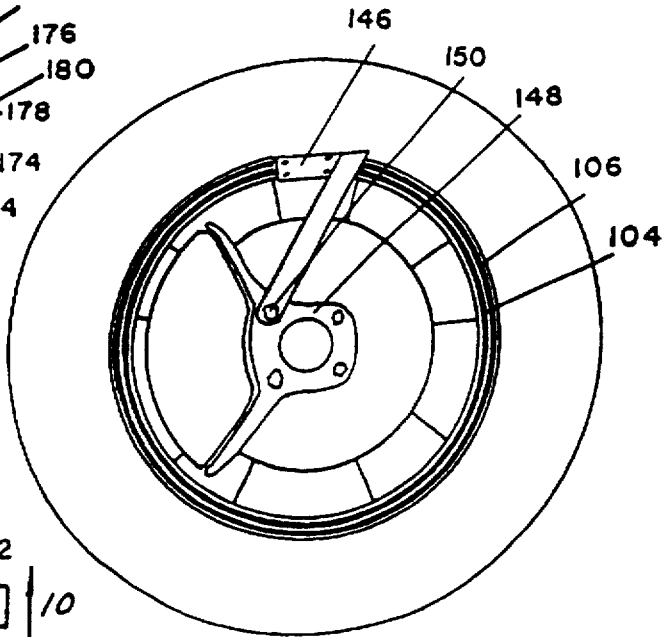
FIG. 7 is a side view of the vehicle wheel provided with the wheel lighting system of the present invention shown in FIG. 1 shown from the inside of the wheel illustrating the ring contactor assembly of the present invention.
Figure 9:
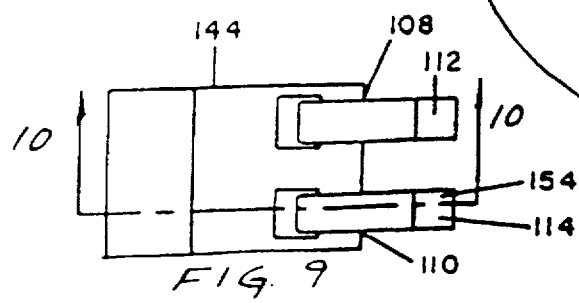
FIG. 9 is a side view of the contactor assembly shown in FIG. 8.

The contactors 108, 110 are mounted in a base 144 which is positioned on the vehicle body 14 so that the contact portions are in electrical contact with their respective circular rings 104, 106. A support arm 146 is provided with one end secured to a body part, such as the caliper brake frame 148, by means of the threaded fastener 150 as seen in FIGS. 5–7. The other end of the support arm 146 is secured to the base 144 with the threaded fasteners 152 so that the electrically conductive movable contact portions 112, 114 of the contactors 108, 110 respectively are in electrical contact with their respective circular rings 104, 106.

For ease of description, only one of the contactors 110 of the contactors 108, 110 will be described in detail. It should be understood that the other contactor 108 is similar in construction.

As seen in FIGS. 8–11, the contactor 110 is mounted in the base 144. The contactor 110 has an electrically conductive movable contact portion 114 which is mounted on the base 144 and is permitted to move with respect thereto. The contact portion 114 has a generally "U" shaped configuration with a contact surface portion 154 forming the base of the "U" and a pair of legs 156, 158 extending in the same direction from opposite ends of the contact portion. The contact surface 154 has an arcuate shape so as to allow it to readily slide in electrical contact with its contactor ring 106. The ends 160 of the legs 156, 158 on their end opposite the contact surface 154 have retainer portions 162 extending toward the inside of the "U" shape of the contact member 114.

The base 144 has a mounting head portion 164 extending from its bottom portion 166. The mounting head portion 164 has outer side walls 168, 170 with a guide groove 172 in each of the side walls. The grooves 172 terminate in a forward and rearward stop edges. The retainer portions 162 of the legs 156, 158 are received in the grooves 172 so that limited movement of the contact member 114 toward and away from the ring 110 is permitted.

The contact member 114 is urged into contact with the ring 110 by the plunger 174 which is positioned in an opening 176 in alignment with the contact member and extending through the base 144. The plunger 174 has a head 178 slidably received in the opening 176 and a shaft portion 180 extending therefrom. The outer end 182 of the opening 176 has a bearing portion 184 with the opening 176 being reduced so as to contact and guide the shaft 180 and allow the plunger 174 to smoothly slide in the opening 176. A spring 187 is provided and positioned between the head 178 and the end 186 of the opening opposite the outer end 182. A retainer plug 188 is provided to keep the spring 187 in this position.

Figure 10:
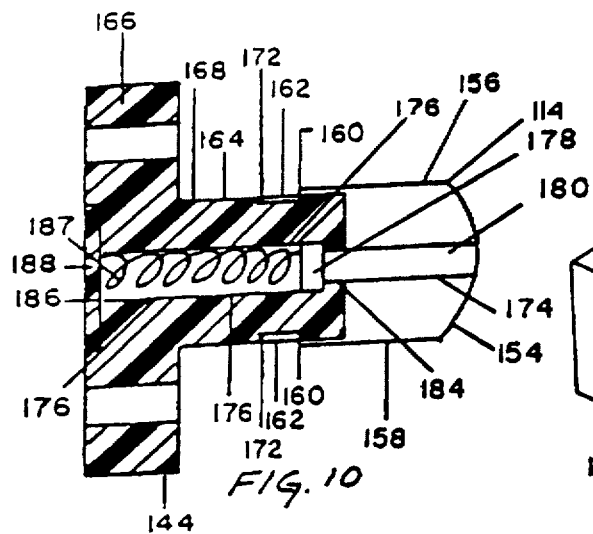
FIG. 10 is a cross sectional view of the contactor assembly shown in FIG. 9 and taken along line 10—10 thereof.
Figure 8:
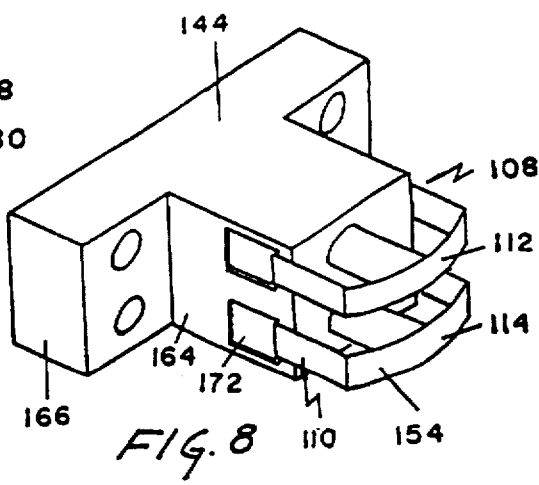
FIG. 8 is a perspective view of the contactor assembly shown in FIG. 7.
Figure 11:
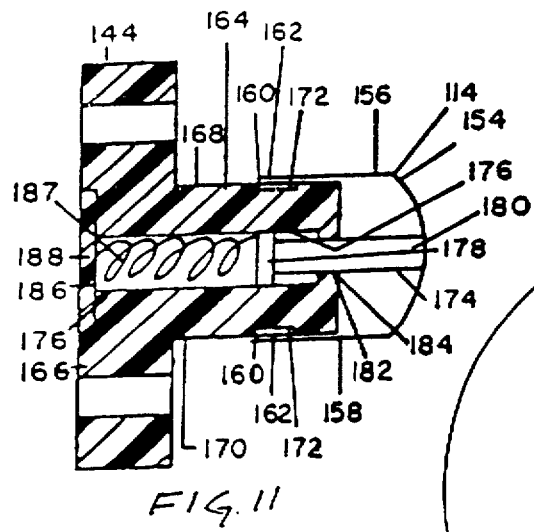
FIG. 11 is a cross sectional view of the contactor assembly shown in FIG. 10 in a depressed position.

Accordingly, the spring 187 creates a force or bias on the plunger 174 and consequently the contact member 144 to maintain contact between the contact member and the ring 110. When there is unevenness in the rim 18, the distance between the ring 110 and the base 144 will vary. When the distance between the ring 110 and the base 144 increases, the spring 187 moves the contact member 144 to an extended position as seen in FIG. 10. On the other hand, when the distance between the ring 110 and the base 144 decreases, the spring 186 moves the contact member 144 to a retracted position as seen in FIG. 11. As can be seen from the above, the present invention provides an electrical conductor device that maintains electrical contact between the battery 102 and the light bulb 26.

The power source or battery 102 has a pair of terminals 190, 191 which are connected to the electrically conductive movable contact portions 112, 114 by means of the wires 192, 194, schematically indicated in FIG. 4. A switch 196 is provided to connect or disconnect electrical current passing through the wire 192 and consequently turn the light bulb 26 on or off. The switch 196 may be conveniently positioned on the dashboard of the vehicle 16 to allow the operator of the vehicle to turn the illuminating system 10 of the present invention on or off.

Figures 12, 13:
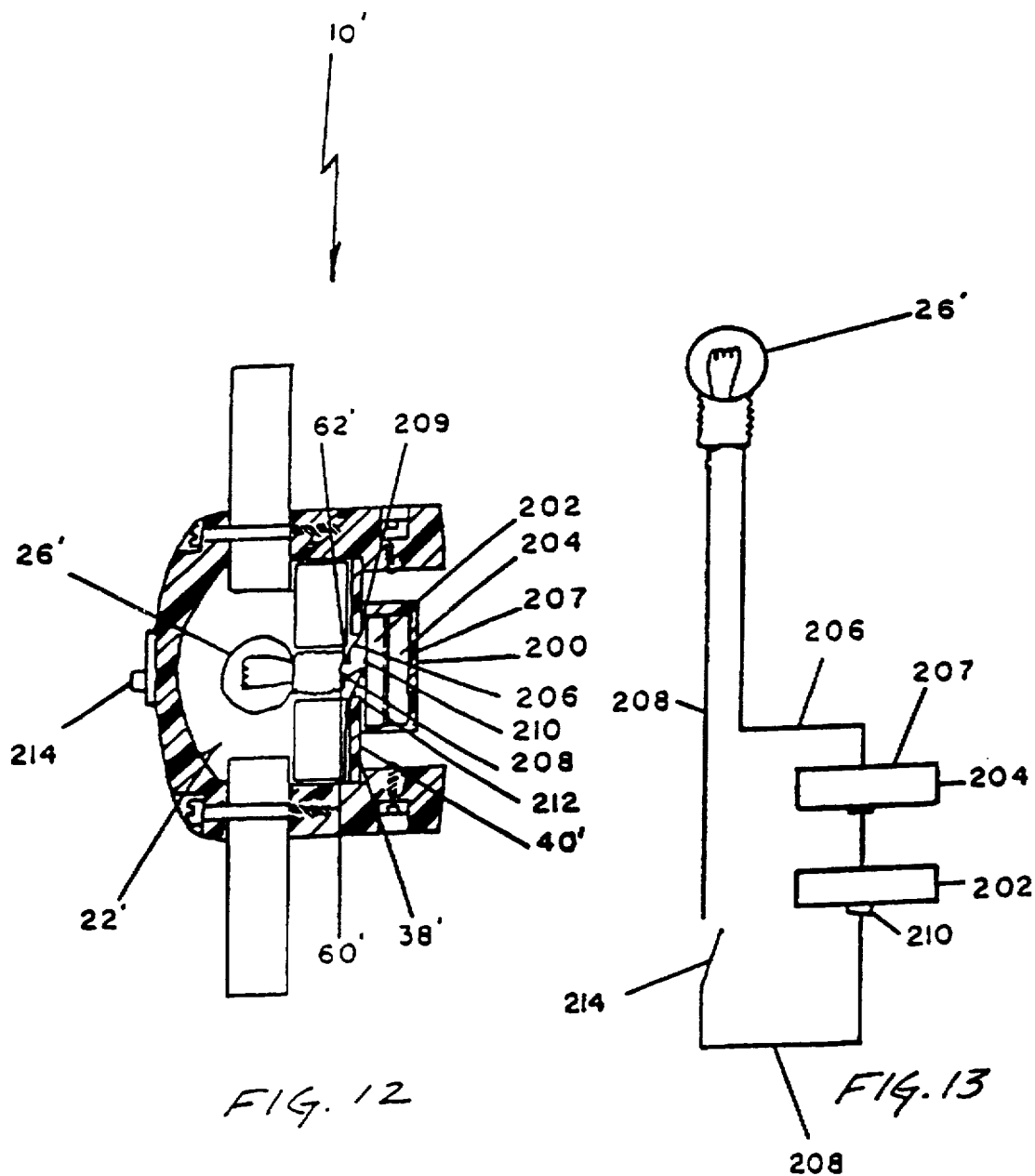
FIG. 12 is a cross sectional view of another embodiment of a wheel lighting system of the present invention.
FIG. 13 is an electrical schematic diagram of the electrical circuit of the embodiment of the wheel illumination system of the present invention shown in FIG. 12.

Another embodiment of the wheel lighting system 10' of the present invention is shown in FIGS. 12 and 13 and is similar in construction with the wheel lighting system 10 described above. For ease of description, the wheel lighting system 10' is numbered with numerals the same as used in connection with the wheel lighting system 10 to denote common parts where appropriate and followed by a prime mark " ' " to denote the wheel lighting system 10'.

The wheel lighting system 10' provides for powering the light bulb 26' with batteries mounted adjacent the chamber 22' as will be more fully described. The bottom member 38' has a battery chamber 200 positioned below the bottom surface 40' thereof. A pair of batteries 202, 204 are positioned in the battery chamber 200 and are electrically in contact with each other. A wire 206 is provided for connecting the terminal 207 of the battery 204 to the terminal 62' of the bulb 26' and has a spring portion 209 to maintain that electrical contact. The terminal 210 of the battery 202 is connected to the other terminal 60' of the bulb 26' by the wire 208. The wire 208 has a spring portion 212 to maintain that electrical contact. A switch 214 is provided to alternately turn the bulb 26' on or off, as the case may be.

This embodiment of the present invention avoids the use of the electrical connector device 100 and provides a self contained wheel illuminating apparatus 10'.

The invention has been described with reference to the preferred embodiments. Obviously, modifications and alterations will occur to others upon reading and understanding of this specification. It is my intention to include all modifications and alterations insofar as they come within the scope of the appended claims or equivalents thereof.

Having described my invention, I claim:

1. A wheel lighting apparatus for illuminating with a predetermined light pattern, a wheel on the body of a vehicle, which pattern rotates with the wheel during movement of the vehicle, said wheel lighting apparatus comprising a chamber mounted on the wheel for rotation therewith, a chamber portion formed from material which contains light in said chamber, a light transmitting member extending substantially radially outwardly of said chamber for transmitting light from said chamber and having a light receiving surface, said chamber formed by said chamber portion and said light receiving surface of said light transmitting member, a light source positioned in said chamber which selectively emits light therefrom to said light receiving surface, said light transmitting member having a light emitting surface for emitting light in a predetermined pattern and a light transmitting portion having a pair of opposing sides that are substantially parallel to reflect light passing through said light transmitting portion for transmitting light from said light receiving surface to said light emitting surface.

2. The wheel lighting apparatus described in claim 1, wherein said light receiving surface of said light transmitting member has a roughened surface which improves reception of the light from said light source into said light transmitting member.

3. The wheel lighting apparatus described in claim 1, wherein said light transmitting portion of said light transmitting member having a pair of opposing sides, at least one of said sides of said light transmitting portion having an optically polished surface to reflect light passing through said light transmitting portion.

4. The wheel lighting apparatus described in claim 1, wherein each of said opposing sides of said light transmitting portion have a polished surface to reflect light therealong.

5. The wheel lighting apparatus described in claim 1, wherein said light emitting surface having a roughened surface to emit light in a predetermined pattern.

6. The wheel lighting apparatus described in claim 1, wherein said one portion of said chamber having a reflective inner surface adjacent said light source.

7. The wheel lighting apparatus described in claim 1, wherein said light source is mounted adjacent said light receiving surface of said light transmitting member.

8. The wheel lighting apparatus described in claim 1, including a light bulb mounting member of heat resistant expanded plastic secured inside said chamber, said light bulb mounting member having an aperture therein for mounting said light source in said chamber.

9. The wheel lighting apparatus described in claim 1, including a power source mounted on the vehicle body and having a positive and negative terminal, an electrical connector device which connects said power source to said light source which includes;

a first and second substantially circular rings of electrically conductive material mounted to one of the wheel and the body, a ring retainer made from electrically non conductive material for mounting said first and said second circular rings on said one of the wheel and the body, a first and a second contactor each having an electrically conductive movable contact portion, said first contactor mounted to the other of the wheel and the body and positioned adjacent to said first ring with said movable contact portion thereof in electrical contact with said first ring, said second contactor mounted to said other of the wheel and the body and positioned adjacent to said second ring with said movable contact portion thereof in contact with said second ring, a first electrical connector for electrically connecting one of said terminals of said power source to the light source through said movable contact portion of said first connector and said first ring, a second electrical connector for electrically connecting the other of said terminals of said power source to the light source through said movable contact portion of said second connector and said second ring.

10. A wheel lighting apparatus for use on a vehicle wheel rotatably mounted on a vehicle body comprising:

a) a power source mounted on the vehicle body and having a positive and negative terminal, b) a light source mounted on the wheel;

c) an electrical connector device which connects said power source to said light source which includes;

a first and second substantially circular rings of electrically conductive material mounted to one of the wheel and the body, a ring retainer made from electrically non conductive material for mounting said first and said second circular rings on said one of the wheel and the body, a first and a second contactor each having an electrically conductive movable contact portion, said first contactor mounted to the other of the wheel and the body and positioned adjacent to said first ring with said flexible contact portion thereof in electrical contact with said first ring, said second contactor mounted to said other of the wheel and the body and positioned adjacent to said second ring with said flexible contact portion thereof in contact with said second ring, a first electrical connector for electrically connecting one of said terminals of said power source to said light source through said flexible contact portion of said first connector and said first ring, a second electrical connector for electrically connecting the other of said terminals of said power source to said light source through said flexible contact portion of said second connector and said second ring, d) a mounting device for mounting the light source on the wheel, e) a light transmitting member which receives light from said light source and transmits the light into a geometric pattern adjacent the wheel.

11. The wheel lighting apparatus for use on an vehicle wheel rotatably mounted on an vehicle body described in claim 10, having a chamber mounted to the wheel, a chamber portion formed from light containing material which contains the light in said chamber, said light source positioned in said chamber, said light transmitting member for transmitting light from said light source, said light transmitting member having a light receiving surface exposed to the light from said light source, said chamber formed by said chamber portion and said light receiving surface of said light transmitting member, said light transmitting member having a light emitting surface for emitting light in a predetermined pattern and a light transmitting portion for transmitting light from said light receiving surface to said light emitting surface.

12. On a vehicle having wheels for supporting the vehicle, a device for illuminating at least one of the wheels in a pattern comprising a light source secured to the wheel, a light transmitting member having a light receiving surface positioned adjacent said light source for receiving light from said light source, a light transmitting portion for transmitting light therethrough having a pair of opposing sides that are substantially parallel, each of said sides of said light transmitting portion having a polished surface to reflect light passing through said light transmitting portion, and a light emitting surface for emitting light from said light source in a predetermined pattern.

13. The device for illuminating at least one wheel in a pattern as described in claim 12, wherein said light receiving surface of said light transmitting member has a roughened surface which improves reception of the light from said light source into said light transmitting member.

14. The device for illuminating at least one wheel in a pattern as described in claim 12, wherein said light emitting surface having a roughened surface to emit light in a predetermined pattern.

15. The device for illuminating at least one wheel in a pattern as described in claim 12, including a power source mounted on the vehicle body and having a positive and negative terminal, an electrical connector device which connects said power source to said light source which includes;

a first and second substantially circular rings of electrically conductive material mounted to one of the wheel and the body, a ring retainer made from electrically non conductive material for mounting said first and said second circular rings on said one of the wheel and the body, a first and a second contactor each having an electrically conductive movable contact portion, said first contactor mounted to the other of the wheel and the body and positioned adjacent to said first ring with said flexible contact portion thereof in electrical contact with said first ring, said second contactor mounted to said other of the wheel and the body and positioned adjacent to said second ring with said flexible contact portion thereof in contact with said second ring, a first electrical connector for electrically connecting one of said terminals of said power source to the light source through said flexible contact portion of said first connector and said first ring, a second electrical connector for electrically connecting the other of said terminals of said power source to the light source through said flexible contact portion of said second connector and said second ring.

\* \* \* \* \*